(12) United States Patent
Lasher, III

(10) Patent No.: US 8,888,116 B2
(45) Date of Patent: Nov. 18, 2014

(54) SUSPENSION FOR HANDCYCLE

(71) Applicant: Lasher Sport, LLC, Anchorage, AK (US)

(72) Inventor: William J. Lasher, III, Anchorage, AK (US)

(73) Assignee: Lasher Sport, LLC., Las Vegas, NV (US)

( * ) Notice: Subject to any disclaimer, the term of this patent is extended or adjusted under 35 U.S.C. 154(b) by 0 days.

(21) Appl. No.: 13/781,548

(22) Filed: Feb. 28, 2013

(65) Prior Publication Data

US 2014/0239610 A1   Aug. 28, 2014

(51) Int. Cl.
*B62M 1/14* (2006.01)
*B62K 25/04* (2006.01)

(52) U.S. Cl.
CPC ...................... *B62K 25/04* (2013.01)
USPC ........... 280/276; 280/277; 280/275; 280/224; 280/225; 280/233

(58) Field of Classification Search
USPC .......... 280/276, 277, 275, 224, 225, 232, 233
See application file for complete search history.

(56) References Cited

U.S. PATENT DOCUMENTS

| | | | | |
|---|---|---|---|---|
| 2,160,034 A * | 5/1939 | Schwinn | ........................ | 280/276 |
| 2,660,455 A * | 11/1953 | Douglas et al. | ................ | 280/277 |
| 2,752,167 A * | 6/1956 | Propst et al. | .................. | 280/276 |
| 3,942,821 A * | 3/1976 | Bock | ............................. | 280/277 |
| 4,712,638 A * | 12/1987 | Kawaguchi et al. | .......... | 180/219 |
| 4,807,898 A * | 2/1989 | Huntly | .......................... | 280/276 |
| 5,417,305 A * | 5/1995 | Parker | .......................... | 180/219 |
| 5,485,893 A * | 1/1996 | Summers | ...................... | 180/219 |
| 5,503,244 A * | 4/1996 | Beirlein | ........................ | 180/219 |
| 5,782,313 A * | 7/1998 | Kurawaki et al. | ............. | 180/219 |
| 6,036,211 A * | 3/2000 | Nohr | ............................. | 280/276 |
| 6,572,129 B1* | 6/2003 | Bean | ............................. | 280/234 |
| 6,786,499 B2* | 9/2004 | Ackley | .......................... | 280/276 |
| 7,413,206 B2* | 8/2008 | Pena et al. | .................... | 280/246 |
| 7,699,330 B2* | 4/2010 | Chen | ............................. | 280/276 |
| 2008/0315550 A1* | 12/2008 | Parker | .......................... | 280/276 |
| 2012/0126506 A1* | 5/2012 | Zawistowski | ................. | 280/275 |
| 2012/0181774 A1* | 7/2012 | Trebichavsky | ................ | 280/277 |

* cited by examiner

*Primary Examiner* — Joseph M Rocca
*Assistant Examiner* — Marlon Arce
(74) *Attorney, Agent, or Firm* — Robert D. Atkins; Atkins and Associates, P.C.

(57) ABSTRACT

A suspension device for a handcycle has a first frame member and a second frame member pivotally coupled to the first frame member. A shock absorber is disposed between the first and second frame members. A lever assembly is disposed between the first and second frame members to transfer motion of the second frame member into the shock absorber. The lever assembly includes a lever pivotally coupled to the first frame member. The lever includes first and second arms coupled at an angle which allows motion of the second frame member to be directed into the shock absorber. The lever assembly is configured to transfer a vertical motion of the second frame member into non-vertical motion directed into the shock absorber. The suspension device further includes a third frame member. The first and second frame members are rotationally coupled to the third frame member.

20 Claims, 9 Drawing Sheets

SUSPENSION FOR HANDCYCLE

FIELD OF THE INVENTION

The present invention relates in general to handcycles and, more specifically, to a suspension system for the front fork of a handcycle.

BACKGROUND OF THE INVENTION

Human-powered vehicles are used as a popular method of transport and exercise. Bicycles and handcycles are examples of human-powered vehicles used by people of many different abilities. A bicycle has two wheels and is powered by a person's legs, whereas a handcycle typically has three wheels and is powered by a person's arms. A handcycle, also called a handbike or hand trike, is propelled and steered through manipulation of the handlebars. The handlebars of a handcycle are coupled to one or more gears which turn a drive wheel or wheels on the handcycle. A rider rotates the handlebars in a crank-like motion to power the handcycle. A rider may operate a handcycle while sitting, kneeling, or reclining in a seat of the handcycle. A rider's legs may rest in stirrups or be secured to the frame of the handcycle. Because handcycles do not require use of the rider's legs, many riders with disabilities can use handcycles.

Handcycles are often designed with one front wheel and two back wheels but may also be designed with other wheel configurations, such as with one back wheel and two front wheels or two front wheels and two back wheels. One common steering mechanism for the handcycle with a single front wheel is called fork-steering. Fork-steering requires the front wheel to turn or tilt with respect to the back wheels. In a fork-steering design, the handcycle frame has two portions. A front frame portion, called the fork, provides a mounting point for the handlebars, gearing, and front wheel. A main frame of the handcycle provides a mounting point for the seat and back wheels. The fork rotates around the front axle with respect to the main frame so that the front wheel can be aimed to steer the handcycle. A rider manipulates the handlebars to turn or tilt the fork in order to steer the front wheel of the handcycle. A rider rotates or cranks the handlebars to turn one or more gears which drive the front wheel and propel the handcycle.

As a handcycle encounters bumps and unevenness in the terrain, the impact of the handcycle hitting a bump is felt by the rider through the handlebars, footrests, and seat of the handcycle. Handcycles may include a rear suspension system which supports weight and absorbs shock at the rear wheels. A rear suspension system may include an independent suspension system, such as double a-arm or wishbone suspension, coupled to the rear of the handcycle frame near the rear wheels. Rear suspension helps the rear wheels maintain contact with the road or terrain when the handcycle encounters unevenness or bumps. Rear suspension systems also provide a smoother ride by reducing vibration of the handcycle frame as the rear wheels encounter rough terrain. However, rear suspension does not adequately address shock or vibration at the front wheel or front fork of the handcycle.

The shock of the front wheel hitting a bump is felt by the rider most dramatically in the handlebars, because both the handlebars and front wheel are mounted to the fork. The steadiness of the handlebars is important on a handcycle, because the rider uses the handlebars not only to steer, but to propel the handcycle. A handcycle rider benefits from handlebars that are as steady as possible during a ride. When the handcycle hits a bump, the vertical change at the front wheel raises the front of the handcycle. The front of the handcycle drops back down as the handcycle traverses the bump. The vertical change at the front of the handcycle causes undesirable motion or vibration in the handlebars and can make holding onto the handlebars and cranking the handlebars more difficult.

The fork at the front of the handcycle provides limited space in which to add parts and features to the handcycle. The fork should be narrow enough to be comfortable for the rider and the fork should be configured to mount the front wheel and gearing components. The fork should also be able to pivot with respect to the rest of the handcycle to allow the rider to steer the handcycle. Added parts and features at the front of the handcycle should not interfere with steering, safety, or the rider's comfort while riding the handcycle.

SUMMARY OF THE INVENTION

A need exists for a front suspension system for a handcycle which stabilizes the front fork of a handcycle. Accordingly, in one embodiment, the present invention is a suspension device for a handcycle comprising a first frame member and a second frame member pivotally coupled to the first frame member. A shock absorber is disposed between the first and second frame members. A lever assembly is disposed between the first and second frame members to transfer motion of the second frame member into the shock absorber.

In another embodiment, the present invention is a suspension device for a handcycle comprising a frame including a first frame member pivotally coupled to a second frame member. A shock absorber is disposed between the first frame member and the second frame member.

In another embodiment, the present invention is a handcycle comprising a mounting bracket and a front fork pivotally coupled to the mounting bracket. A suspension assembly is disposed between the front fork and the mounting bracket.

In another embodiment, the present invention is a method of making a suspension device for a handcycle, comprising the steps of providing a frame including a first frame member pivotally coupled to a second frame member, disposing a shock absorber between the first frame member and the second frame member, and disposing a lever assembly between the first and second frame members to transfer motion of the second frame member into the shock absorber.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
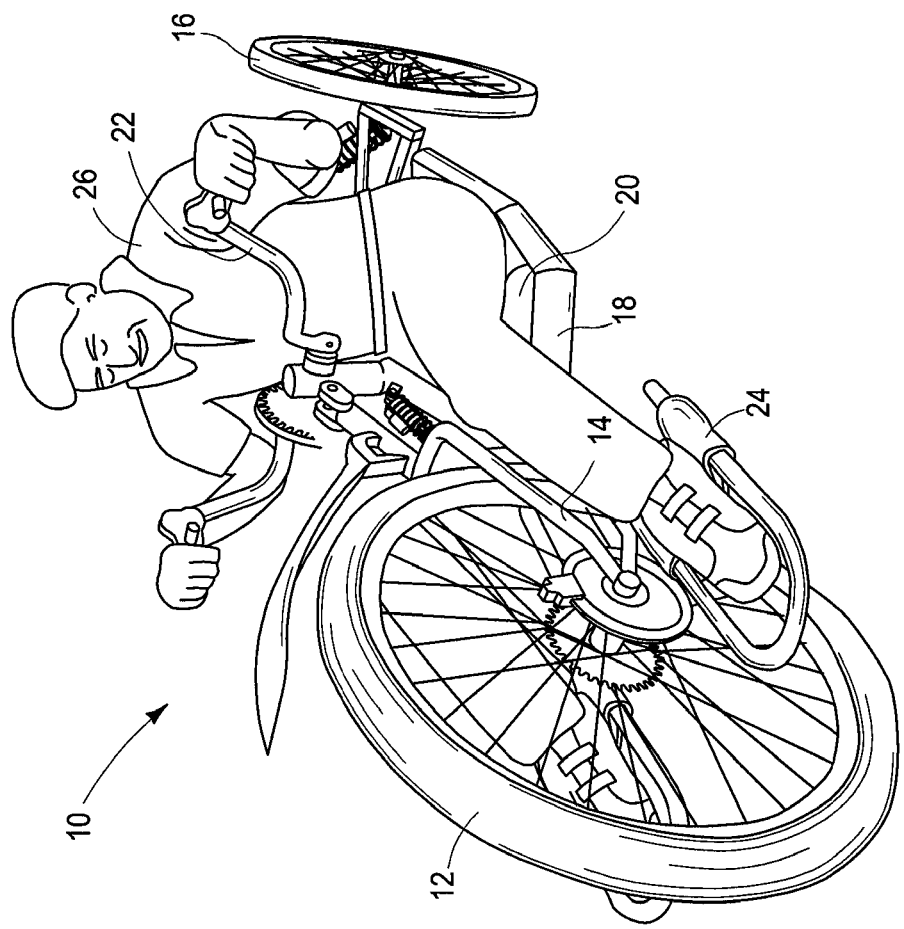
FIG. 1 illustrates generally a handcycle.

A handcycle 10 is shown in FIG. 1. Handcycle 10 includes one front wheel 12 mounted to front fork 14. Two rear wheels 16 are mounted to frame 18. Front wheel 12 and rear wheels 16 can be road wheels, mountain bike wheels, wheelchair wheels, or other types of bicycle and handcycle wheels. Front fork 14 is a part of frame 18. Front fork 14 and frame 18 can be metal, metal alloy, polymer, fiberglass, carbon fiber, composite, or a natural material. In one embodiment, frame 18 is ovalized magnesium and front fork 14 is 6061-T6 aluminum. Frame 18 also provides a mounting area for seat 20 of handcycle 10. Handlebars or crankarms 22 and legrests or footrests 24 are mounted to front fork 14. Rider 26 is shown in a riding position on handcycle 10. Rider 26 sits in seat 20 while rider's lower legs and feet are positioned in footrests 24. Rider 26 grasps or otherwise secures to handlebars 22 which are mounted to an upper portion of front fork 14. Rider 26 cranks handlebars 22 in order to propel handcycle 10. Rider 26 uses handlebars 22 to turn or tilt front fork 14 and front wheel 12 to steer handcycle 10.

Figure 2:
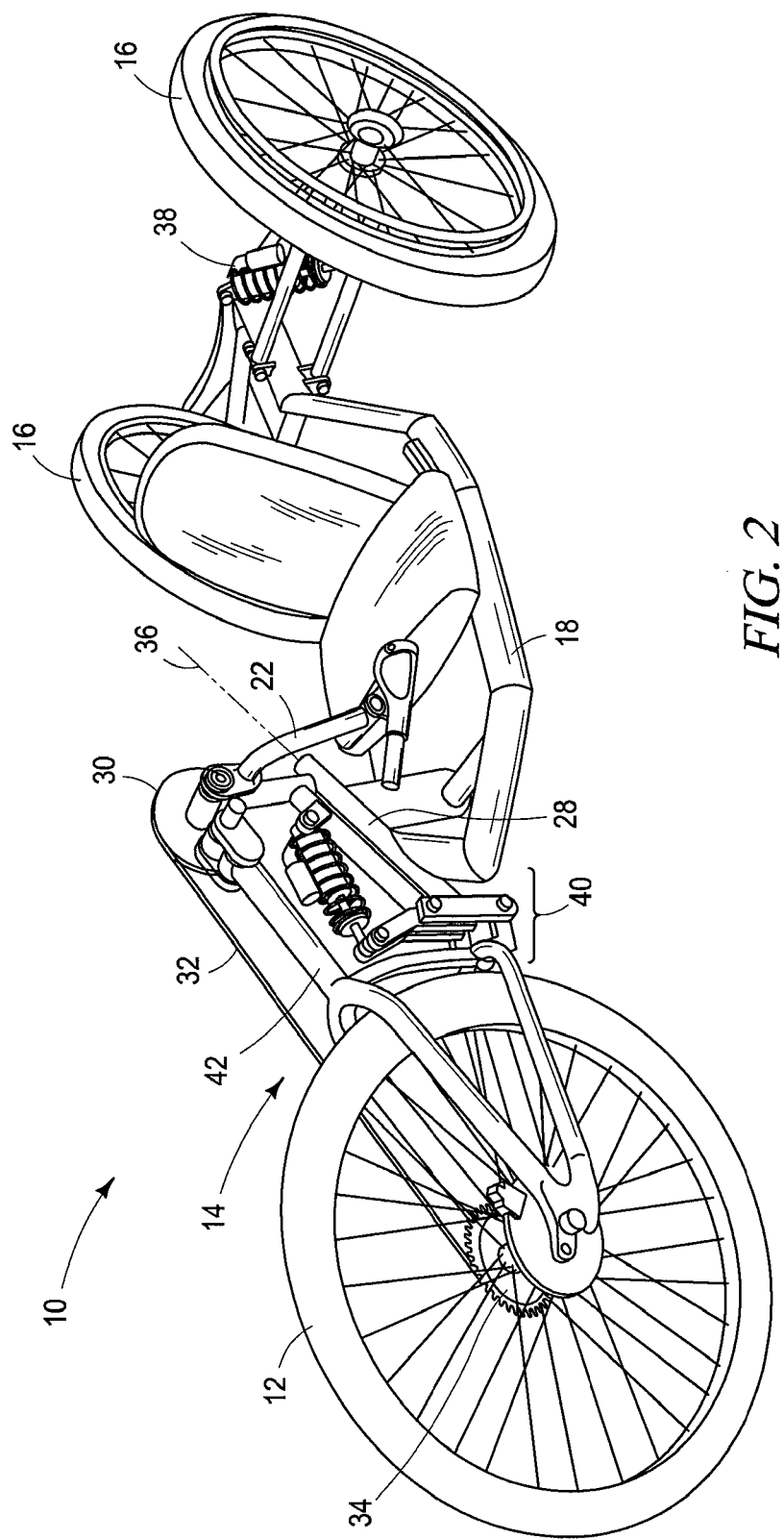
FIG. 2 illustrates a handcycle including a front and rear suspension system.

FIG. 2 shows handcycle 10 in more detail. Front fork 14 and frame 18 each constitutes a frame portion or frame member of handcycle 10. Front fork 14 extends from a steering area of handcycle 10 to front wheel 12. Front fork 14 provides a mounting point for handlebars 22, gear 30, and front wheel 12 and for other handcycle components such as breaks, break lines, derailleurs, and lights. Front wheel 12 is also the drive wheel of handcycle 10. Handlebars 22 are rotated in a crank-like motion to drive gear 30. Chain 32 is coupled to gear 30 and to gear 34 which is mounted to front wheel 12. Chain 32 turns gear 34 and front wheel 12. Handcycle 10 may include a plurality of gears for a multi-speed chain drive system. Rotating or cranking handlebars 22 rotates gear 30 which drives chain 32 and gear 34 thereby propelling front wheel 12 and handcycle 10.

Handlebars 22 are also used to steer front fork 14 of handcycle 10. Front fork 14 is an articulating portion of frame 18 that is rotationally coupled to frame 18 at axle 28. Front fork 14 rotates, tilts, or pivots with respect to frame 18 when handlebars 22 are used to turn front fork 14. Front fork 14 rotates about axis 36 of axle 28. In one embodiment, axle 28 includes an inner shaft coupled to front fork 14 and outer shaft coupled to frame 18. The inner shaft of axle 28 rotates within the outer shaft of axle 28 to allow front fork 14 to turn or tilt relative to frame 18.

Handcycle 10 also includes rear suspension 38. Rear suspension is coupled to frame 18 and to rear wheels 16. Rear suspension 38 absorbs shock at rear wheels 16 when rear wheels 16 hit bumps or encounter obstacles or uneven terrain. Rear suspension 38 reduces the impact of shock to handcycle 10 primarily at the rear portion of handcycle 10. Rear suspension 38 may include a double a-arm type suspension at each of rear wheels 16. Rear suspension 38 may also include other types of suspension systems depending on the number of rear wheels and the design and intended use of handcycle 10.

Handcycle 10 includes a front suspension system incorporated or built into front fork 14. Front suspension 40 absorbs the shock caused by the vertical motion of front wheel 12 as front wheel 12 encounters uneven terrain, such as a bump or obstacle. Front suspension 40 primarily stabilizes a front portion of handcycle 10 including handlebars 22, but also improves stabilization of the entire handcycle 10. Front suspension 40 generally includes an additional articulating subportion of front fork 14 and a damper to absorb the motion of the articulating subportion. Pivoting fork 42 comprises the articulating subportion of front fork 14. Pivoting fork 42 pivots vertically with respect to the rest of front fork 14 and with respect to frame 18. Front suspension 40 reduces the vibration of handcycle 10 traversing uneven terrain, particularly in handlebars 22 and frame 18 while front wheel 12 and pivoting fork 42 move vertically over bumps or divots.

Figure 3:
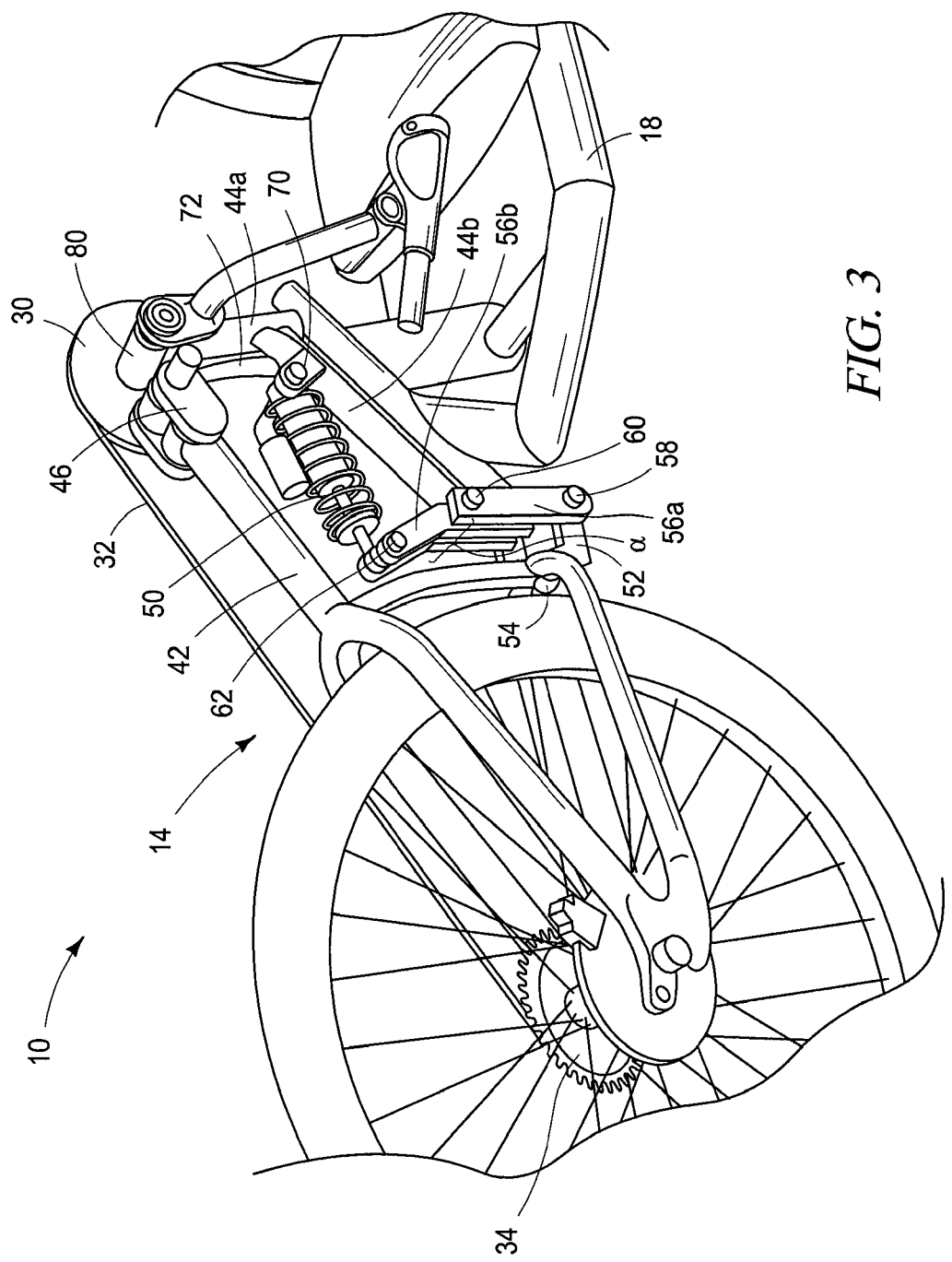
FIG. 3 illustrates further detail of the front suspension system for a handcycle.

FIG. 3 illustrates the front suspension system in further detail. Front fork 14 with front suspension 40 can be defined as including two main structures or portions, a fixed portion and a pivoting portion. A fixed portion of front suspension 40 includes mounting bracket 44 of front fork 14. Mounting bracket 44 includes vertical portion 44a and horizontal portion 44b. Mounting bracket 44 is mounted to frame 18 at axle 28. Mounting bracket 44 of front fork 14 is mounted such that mounting bracket 44 does not pivot vertically with respect to frame 18. Mounting bracket 44 is still able to rotate as a part of the entire front fork 14, which rotates at axle 28 with respect to frame 18 to allow handcycle steering. Therefore, the fixed portion of front fork 14 is fixed in terms of a vertical direction, but moves freely about axle 28.

The articulating or pivoting portion of front suspension 40 includes pivoting fork 42 of front fork 14. Front fork 14 is configured to allow pivoting fork 42 to pivot with respect to mounting bracket 44. Pivoting fork 42 is pivotally coupled to mounting bracket 44 at upper or main pivot point 46. Front wheel 12 is mounted between prongs of pivoting fork 42. When front wheel 12 traverses a bump, front wheel 12 raises up in a vertical or z-direction causing pivoting fork 42 to move in a vertical direction. Mounting bracket 44 and frame 18 remain fixed in the vertical direction while pivoting fork 42 pivots at main pivot point 46. As a part of the overall structure of front fork 14 which rotates or tilts to steer handcycle 10, pivoting fork 42 also rotates about axle 28. Therefore, pivoting fork 42 is configured to articulate in two directions relative to frame 18. Pivoting fork 42 pivots vertically as a part of front suspension 40 and also rotates with front fork 14 about axle 28 to allow steering of handcycle 10.

Front suspension 40 dampens the shock to handcycle 10 caused by front wheel hitting a bump by absorbing vertical motion of pivoting fork 42. Front suspension 40 includes a series of levers to transfer the vertical motion of pivoting fork 42 into a horizontal motion directed into shock absorber 50. A first lever, lower link 52, is welded or rigidly attached to a lower area of pivoting fork 42 at lower front suspension mount 54. Alternatively, lower link may be an extension of pivoting fork 42 or may be pivotally coupled to pivoting fork 42. Lower link 52 can be metal, metal alloy, polymer, fiberglass, carbon fiber, composite, or a natural material.

Front suspension 40 includes rocker arm 56. Lower link 52 transfers the vertical motion of pivoting fork 42 into rocker arm 56. Rocker arm 56 includes lower arm 56a and upper arm 56b. Lower arm 56a is welded or rigidly attached to upper arm 56b. Alternatively, lower arm 56a and upper arm 56b are formed as a single piece. An end of lower link 52 is pivotally coupled to an end of lower arm 56a of rocker arm 56 at pivot point 58. Lower arm 56a and upper arm 56b meet at pivot point 60. Rocker arm 56 is pivotally coupled at pivot point 60 to horizontal portion 44b portion of mounting bracket 44. Rocker arm 56 rotates or pivots at pivot point 60 to transfer the force from lower link 52 to shock absorber 50. Rocker arm 56 can be metal, metal alloy, polymer, fiberglass, carbon fiber, composite, or a natural material.

Lower arm 56a and upper arm 56b are attached or formed at a fixed angle α. Angle α is determined based on the shape and size of front fork 14 and the available space within front fork 14 to build front suspension 40. Angle α allows rocker arm 56 to pivot within the space available within front fork 14 without being encumbered or contacting other parts of front fork 14. For example, angle α allows rocker arm 56 to avoid contacting pivoting fork 42, because such contact would encumber the function of front suspension 40. Angle α is also selected such that upper arm 56b of rocker arm 56 is substantially or nearly perpendicular to horizontal portion 44a of mounting bracket 44 and to axle 28.

Rocker arm 56 is pivotally coupled at pivot point 62 to shock absorber 50 at an end of upper arm 56b. Rocker arm 56 is configured to transfer the force from lower link 52 at pivot point 58 to shock absorber 50 at pivot point 62. Shock absorber 50 functions optimally when a force acting on shock absorber 50 is oriented in a direction parallel with and along the center axis of shock absorber 50. When rocker arm 56 pivots about pivot point 60, the direction of force at pivot point 62 will change as the end of upper arm 56b moves in an arc. The direction of force at the end of upper arm 56b will be in a direction tangent to the arc. The length and angle of rocker arm 56 is selected to direct force into shock absorber 50 in a direction substantially or nearly parallel to shock absorber 50 in order to maximize the force absorbed by shock absorber 50. The ideal directional force on shock absorber 50 is described herein as the horizontal force acting on shock absorber 50. Lower arm 56a and upper arm 56b of rocker arm 56 are configured at angle α necessary to produce a substantially horizontal force at pivot point 62 acting on shock absorber 50. A horizontal force directed at shock absorber 50 by upper arm 56b optimizes the function of shock absorber 50 and front suspension 40. Shock absorber 50 may include various types of shock absorbing assemblies, such as coil springs with a damper, an elastomer chamber shock absorber, or a hydraulic fluid system. In the present embodiment, shock absorber 50 includes a coil spring and a damper.

Shock absorber 50 includes a second end opposite the end coupled to rocker arm 56. The second end of shock absorber 50 is pivotally coupled to shock mount 70. Shock mount 70 is rigidly affixed to vertical portion 44a or horizontal portion 44b of mounting bracket 44, or shock mount 70 is rigidly affixed to both vertical and horizontal portions 44a and 44b of mounting bracket 44. An optional vertical stabilizer 72 extends from shock mount 70 to main pivot point 46. Vertical stabilizer 72 is welded or rigidly affixed to vertical and horizontal portions 44a and 44b of mounting bracket 44. Vertical stabilizer 72 is also welded or rigidly affixed to shock mount 70. The additional welds, material, and contact points of vertical stabilizer 72 to mounting bracket 44 and shock mount 70 add strength to front fork 14 and front suspension 40. Vertical stabilizer 72 can be metal, metal alloy, polymer, fiberglass, carbon fiber, composite, or a natural material.

Shock mount 70, mounting bracket 44, and vertical stabilizer 72 together constitute the vertically fixed or stationary portion of front fork 14. Pivoting fork 42 constitutes a pivoting portion of front fork 14. Front suspension 40 is disposed between pivoting fork 42 and mounting bracket 44. Lower link 52 and rocker arm 56 constitute a lever assembly disposed between pivoting fork 42 and mounting bracket 44. The lever assembly of front suspension 40 transfers vertical motion of pivoting fork 42 into a force directed into shock absorber 50. The direction of force is substantially parallel to the shock absorber and can be described as a horizontal force. Shock absorber 50 of front suspension 40 is configured to absorb the horizontal force transferred from the lever assembly.

Pivoting fork 42 pivots with respect to the vertically fixed portion of front fork 14 at main pivot point 46. The location of main pivot point 46 is selected to minimize the impact of the vertical motion of front wheel 12 on the various components of handcycle 10 coupled to mounting bracket 44. Mounting bracket 44 includes bracket shell 80. Bracket shell 80 is configured to couple to handlebars 22 as well as to gear 30, chain 32, and other components of handcycle 10. In one embodiment, main pivot point 46 is offset from bracket shell 80. The offset of main pivot point 46 reduces the motion at bracket shell 80. Therefore, gear 30, chain 32, and handlebars 22 are less affected by the vertical pivoting motion of pivoting fork 42.

The offset of main pivot point 46 from bracket shell 80 reduces the chain line movement of chain 32. Chain 32 is coupled to gear 30 mounted to bracket shell 80 and to gear 34 mounted to front wheel 12. When pivoting fork 42 moves, chain 32 is impacted by the motion causing chain line movement. The stability of chain 32 is important to keep chain 32 in contact with gears 30 and 34. Chain line movement is undesirable because chain 32 loosens or tightens as the chain line moves making chain 32 more likely to fall off, detach, or derail from gear 30. With main pivot point 46 offset from bracket shell 80, chain line movement is reduced to 1/16 inch or less. Without the offset of main pivot point 46, chain line movement is more than 1/16 inch.

The offset of main pivot point 46 also reduces movement and vibration at bracket shell 80. Handlebars 22 are rotationally mounted to bracket shell 80, which is the center of rotation for handlebars 22. Motion at bracket shell 80 causes the center of rotation or the centerline axis of handlebars 22 to move. Movement at the centerline of handlebar 22 is undesirable because a changing centerline axis causes more difficulty for the rider to rotate or crank handlebars 22. When the centerline changes even one half inch or less, cranking handlebars 22 is more difficult for the rider. The offset of main pivot point 46 from bracket shell 80 and handlebars 22 substantially reduces motion of the centerline axis, because bracket shell 80 is fixed and handcycle frame components are not pivoting at the point where handlebars 22 are mounted.

Figure 4A:
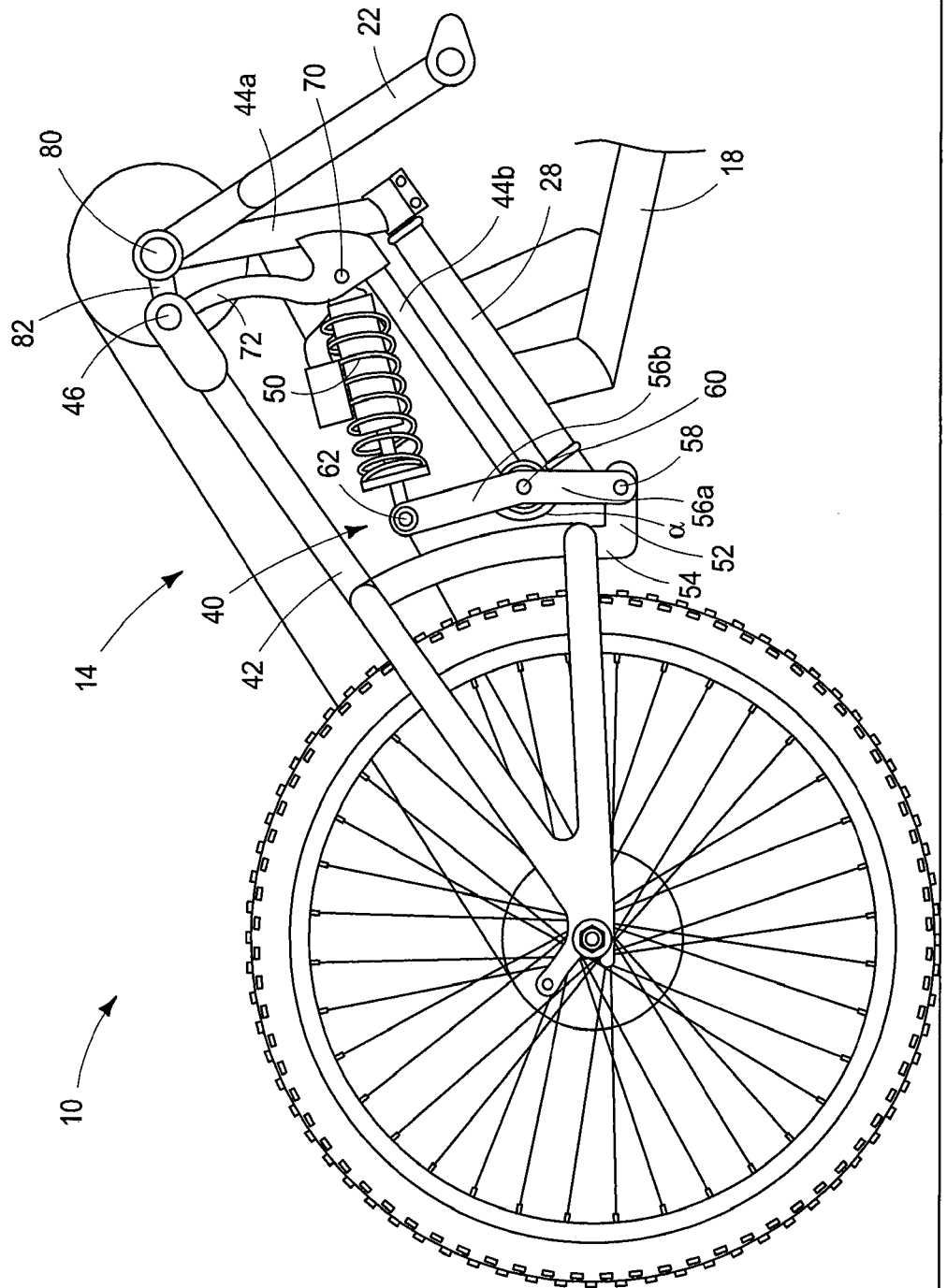
FIGS. 4a-4d illustrate the various positions of the front fork and front suspension.

FIGS. 4a-4d illustrate the various positions of pivoting fork 42 and front suspension 40. FIG. 4a shows a side view of a position of front fork 14 when handcycle 10 is situated on a substantially flat surface. Frame 18 is in a neutral position with respect to the ground. Front fork 14 is in a starting position, which is the position for handcycle 10 when riding on a smooth, flat surface. Shock absorber 50 is in a neutral position.

In FIG. 4a, the offset of main pivot point 46 from bracket shell 80 can more easily be seen. Connector 82 is rigidly coupled to bracket shell 80. Connector 82 extends forward from bracket shell 80 to main pivot point 46 thereby providing the offset for main pivot point 46. Pivoting fork 42 is pivotally coupled to connector 82 at main pivot point 46.

Figure 4B:
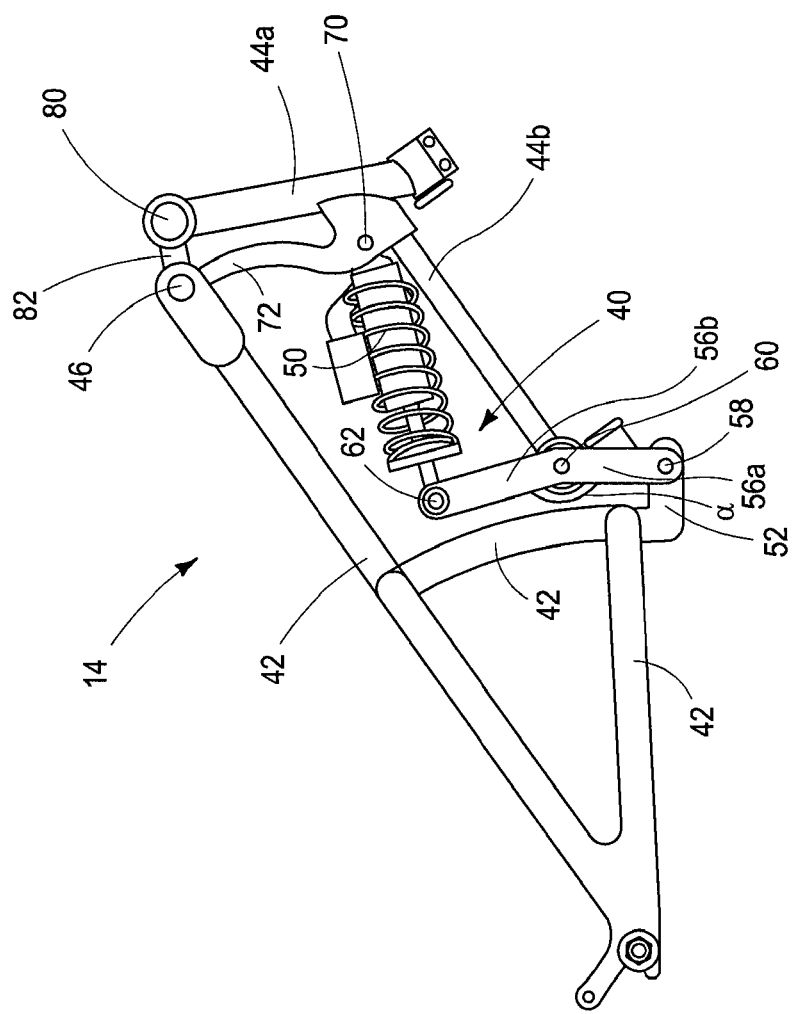

FIG. 4b shows a side view of front fork 14 and front suspension 40 in a similar position as in FIG. 4a. Front suspension 40 is shown in a neutral position disposed between pivoting fork 42 and mounting bracket 44. Front fork 14 includes pivoting fork 42 and mounting bracket 44. Pivoting fork 42 includes a single bar that extends from connector 82 at main pivot point 46 down to one or more forked portions of pivoting fork 42. Front suspension 40 includes lower link 52, rocker arm 56, and shock absorber 50. Front suspension 40 is disposed among the components of front fork 14 between pivoting fork 42 and mounting bracket 44.

Figure 4C:
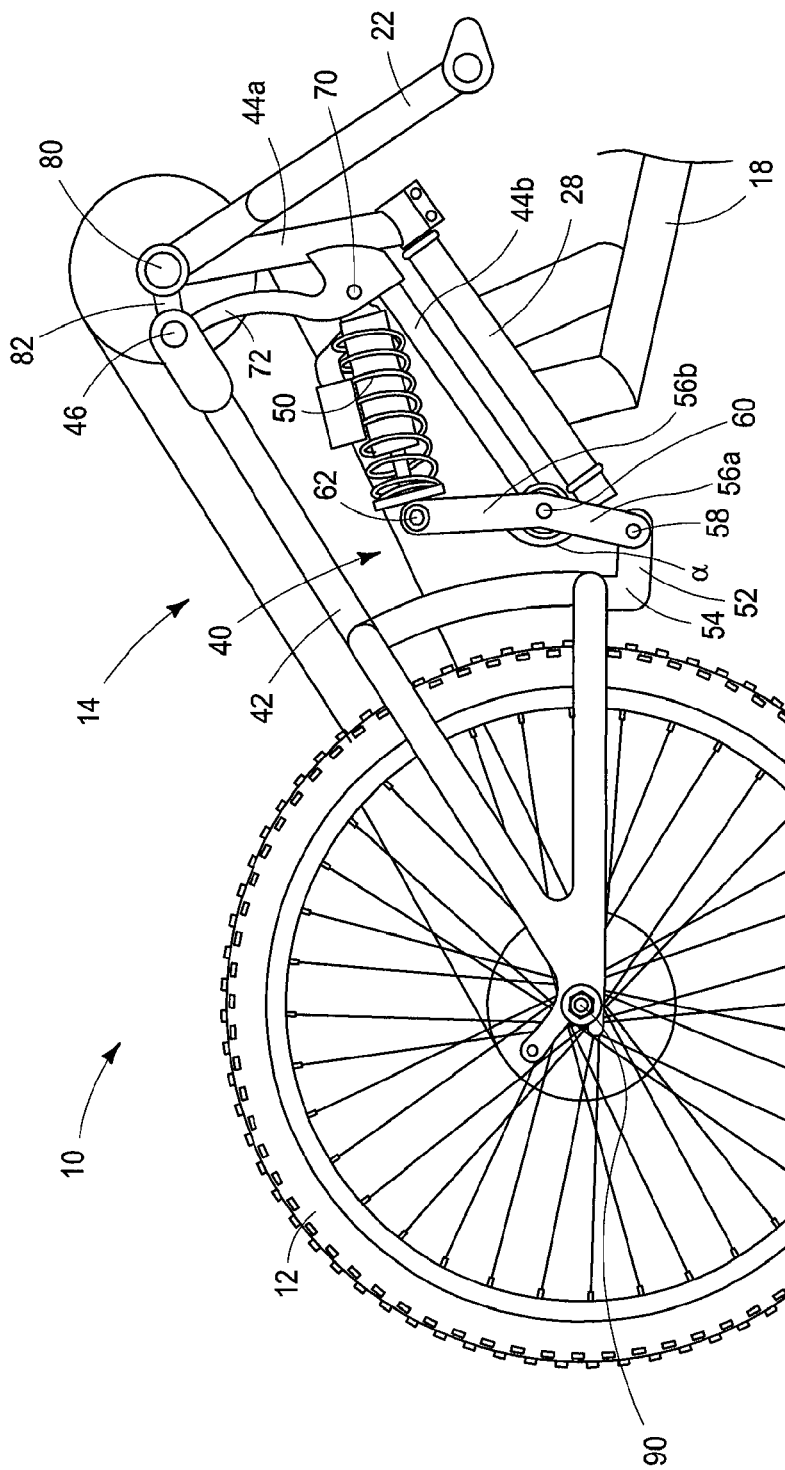

FIG. 4c shows a position of front fork 14 when front wheel 12 of handcycle 10 encounters a bump. Front suspension 40 engages when front wheel 12 traverses a bump or uneven terrain. Front wheel 12 must raise upwards as handcycle 10 moves forward over the bump. Pivoting fork 42 allows front wheel 12 to move vertically over the bump while frame 18 of handcycle 10 remains in a neutral position with respect to the ground. Pivoting fork 42 pivots vertically with respect to handcycle 10 at main pivot point 46. Lower link 52 is rigidly attached to pivoting fork 42. As pivoting fork 42 raises upwards at end 90, lower link 52 moves forward and upwards. Lower link 52 pulls on lower arm 56a of rocker arm 56 at pivot point 58. Rocker arm 56 pivots at pivot point 60 causing upper arm 56b of rocker arm 56 to push into shock absorber 50 at pivot point 62. Shock absorber 50 is compressed and thereby absorbs the impact of the vertical motion of front wheel 12 and pivoting fork 42. Vertical motion of front wheel 12 and pivoting fork 42 is transferred into horizontal force by rocker arm 56. The horizontal force is dampened by shock absorber 50.

Figure 4D:
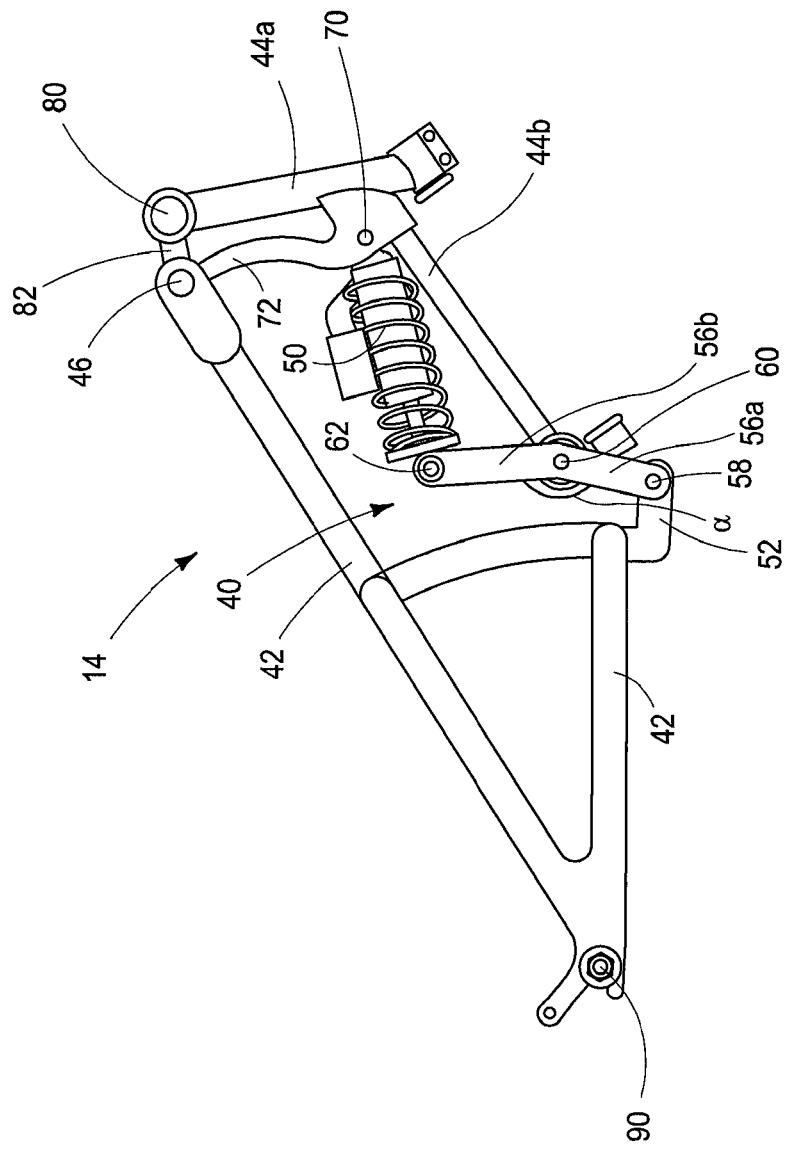

FIG. 4d shows a side view of front fork 14 and front suspension 40 in a similar position as in FIG. 4c. Front suspension 40 is shown in an active or compressed position. Mounting bracket 44 remains in a vertically fixed position and pivoting fork 42 pivots with respect to mounting bracket 44 at main pivot point 46. Pivoting fork 42 is raised at end 90 and lower link 52 is pulled forward. Lower arm 56a of rocker arm 56 is pulled forward at pivot point 58, causing rocker arm 56 to rotate about pivot point 60. Upper arm 56b of rocker arm 56 is pushed back towards shock absorber 50. Shock absorber 50 absorbs force from upper arm 56b.

Pivoting fork 42 and front suspension 40 return to the neutral position, shown in FIG. 4a, when front wheel 12 has cleared the obstacle and returns to flat ground.

Front suspension 40 reduces the impact to handcycle 10 when front wheel 12 encounters uneven terrain. Generally, vibration at the front of handcycle 10 is felt by the rider most dramatically in handlebars 22. As front wheel 12 moves up and down over the terrain, pivoting fork 42 pivots with the vertical motion of front wheel 12 while front suspension 40 absorbs and dampens the movement of pivoting fork 42. Pivoting fork 42 allows mounting bracket 44, bracket shell 80, and frame 18 to remain in a neutral position with respect to the ground when handcycle 10 hits a bump. Handcycle 10 does not lift upwards at the front end. Instead, end 90 of pivoting fork 42 raises and lowers, while the rest of handcycle 10 remains substantially parallel to or neutral with the ground. The steadiness of handcycle 10 reduces vibration in handcycle 10. Front suspension 40 substantially reduces vibration in handlebars 22 compared to a handcycle without front suspension 40. Because movement and vibration in handlebars 22 is reduced by front suspension 40, rider retains a better hold on handlebars 22 and maintains better control over handcycle 10. Reduced vibration in handcycle 10 makes handcycle 10 easier and more comfortable to ride. The rider retains better control over steering handcycle 10. Front wheel 12 maintains better contact with the ground and other surfaces. Therefore, front suspension 40 improves the stability, traction, and control of handcycle 10. Handcycle 10 is also safer to ride because a rider's control over handcycle 10 is improved.

Front suspension 40 is designed to fit within front fork 14 of handcycle 10 without impeding the function of handcycle 10. Front suspension 40 including lower link 52, rocker arm 56, and shock absorber 50 fits between pivoting fork 42 and mounting bracket 44. Front suspension 40 does not hinder the rotation of front fork 14 around axle 28 with respect to frame 18. Front suspension 40 is incorporated into front fork 14 and rotates along with front fork 14 when handcycle 10 is steered. Front suspension 40 is narrow and similar in width to front fork 14. Therefore, front suspension 40 does not interfere with the placement of the rider's legs on either side of front fork 14 and front wheel 12.

Figure 5:
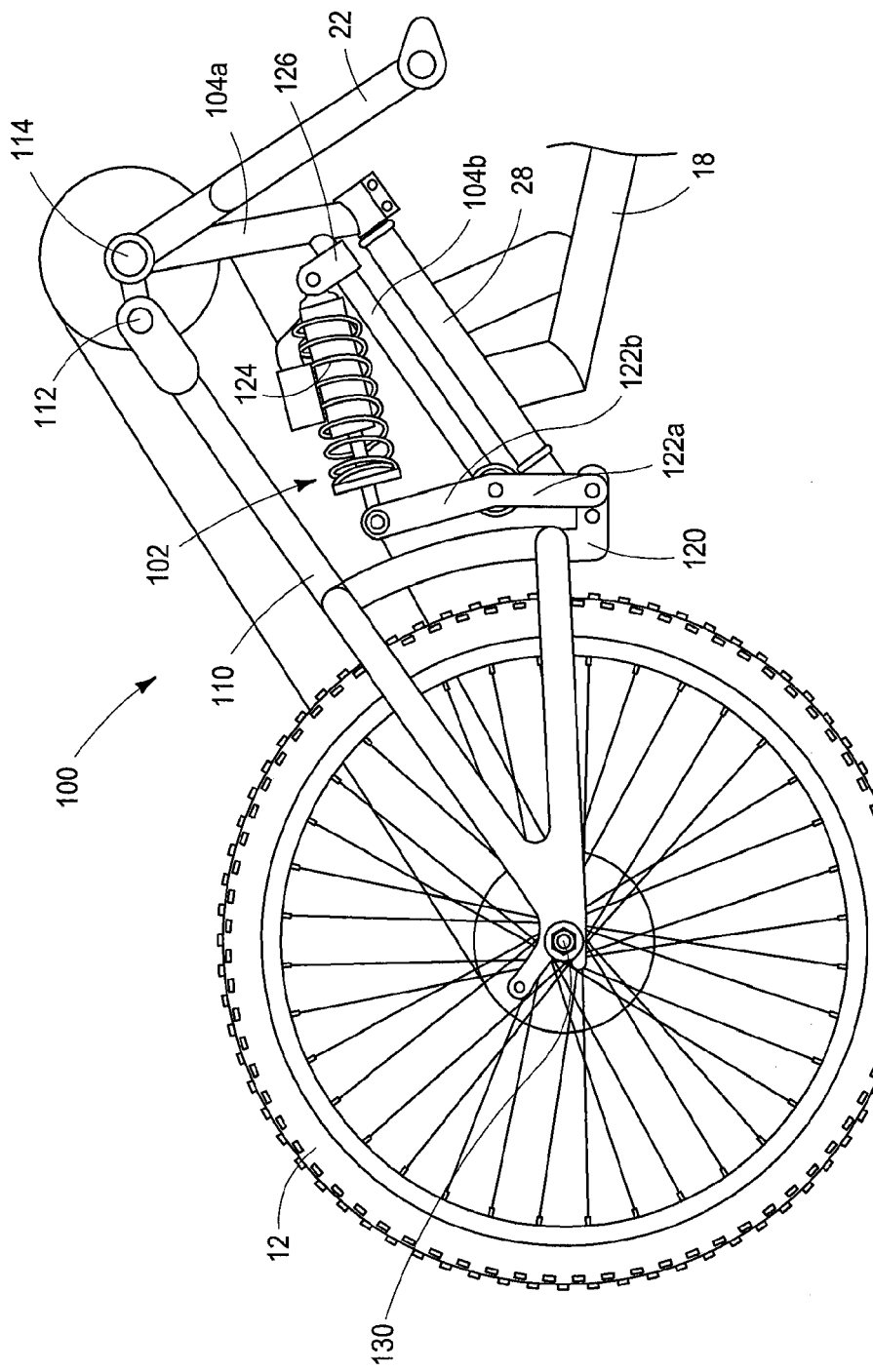
FIG. 5 illustrates an alternative embodiment of the handcycle suspension system.

FIG. 5 illustrates an alternative embodiment of the front fork and front suspension of the handcycle. Front fork 100 is similar to front fork 14. Front fork 100 includes front suspension 102. Front suspension is similar to front suspension 40. Front fork 100 includes two main structures or portions, a fixed portion and a pivoting portion. A fixed portion of front suspension 102 includes mounting bracket 104 of front fork 100, but does not include the vertical stabilizer. Mounting bracket 104 includes vertical portion 104a and horizontal portion 104b. Mounting bracket 104 is mounted to frame 18 at axle 28. Mounting bracket 104 of front fork 100 is mounted such that mounting bracket 104 does not pivot vertically with respect to frame 18. Mounting bracket 104 is able to rotate as a part of the entire front fork 100, which rotates about axle 28 with respect to frame 18 to allow handcycle steering. Therefore, the fixed portion of front fork 100 is fixed in terms of a vertical direction, but moves freely about axle 28.

The articulating or pivoting portion of front suspension 102 includes pivoting fork 110 of front fork 100. Front fork 100 is configured to allow pivoting fork 110 to pivot with respect to mounting bracket 104. Pivoting fork 110 is pivotally coupled to mounting bracket 104 at upper or main pivot point 112. Main pivot point 112 is offset from mounting bracket 104 and bracket shell 114. Front wheel 12 is mounted between prongs of pivoting fork 110. When front wheel 12 traverses a bump, front wheel 12 raises up in a vertical or z-direction causing pivoting fork 110 to move in a vertical direction. Mounting bracket 104 and frame 18 remain fixed in the vertical direction while pivoting fork 110 pivots at main pivot point 112. As a part of the overall structure of front fork 100 which rotates or tilts to steer handcycle 10, pivoting fork 110 also rotates about axle 28. Therefore, pivoting fork 110 is configured to articulate in two directions relative to frame 18. Pivoting fork 110 pivots vertically as a part of front suspension 102 and also rotates with front fork 100 about axle 28 to allow steering of handcycle 10.

Front suspension 102 is similar to front suspension 40. Front suspension 102 includes lower link 120, rocker arm 122, and shock absorber 124. Lower link 120 is similar to lower link 52. Rocker arm 122 is similar to rocker arm 56. Shock absorber 124 is similar to shock absorber 50. Shock absorber 124 is pivotally coupled to shock mount 126. Shock mount 126 is rigidly affixed to vertical portion 104a or horizontal portion 104b of mounting bracket 104, or shock mount 126 is rigidly affixed to both vertical and horizontal portions 104a and 104b of mounting bracket 104. Shock mount 126 and mounting bracket 104 together constitute the vertically fixed or stationary portion of front fork 100.

Pivoting fork 110 constitutes a pivoting portion of front fork 100. Front suspension 102 is disposed between pivoting fork 110 and mounting bracket 104. Lower link 120 and rocker arm 122 constitute a lever assembly disposed between pivoting fork 110 and mounting bracket 104. The lever assembly of front suspension 102 transfers vertical motion of pivoting fork 110 into a force directed into shock absorber 124. The direction of force is substantially parallel to the shock absorber and can be described as a horizontal force. Shock absorber 124 of front suspension 102 is configured to absorb the horizontal force transferred from the lever assembly.

Front suspension 102 reduces the impact to handcycle 10 when front wheel 12 encounters uneven terrain. Generally, vibration at the front of handcycle 10 is felt by the rider most dramatically in handlebars 22. As front wheel 12 moves up and down over the terrain, pivoting fork 110 pivots with the vertical motion of front wheel 12 while front suspension 102 absorbs and dampens the movement of pivoting fork 110. Pivoting fork 110 allows mounting bracket 104, bracket shell 114, and frame 18 to remain in a neutral position with respect to the ground when handcycle 10 hits a bump. Handcycle 10 does not lift upwards at the front end. Instead, end 130 of pivoting fork 110 raises and lowers, while the rest of handcycle 10 remains substantially parallel to or neutral with the ground. The steadiness of handcycle 10 reduces vibration in handcycle 10. Front suspension 102 substantially reduces vibration in handlebars 22 compared to a handcycle without front suspension 102. Because movement and vibration in handcycle 10 is reduced by front suspension 102, rider retains a better hold on handlebars 22 and maintains better control over handcycle 10. Reduced vibration in handcycle 10 makes handcycle 10 easier and more comfortable to ride. The rider retains better control over steering handcycle 10. Front wheel 12 maintains better contact with the ground and other surfaces. Therefore, front suspension 102 improves the stability, traction, and control of handcycle 10. Handcycle 10 is also safer to ride because a rider's control over handcycle 10 is improved.

Figure 6:
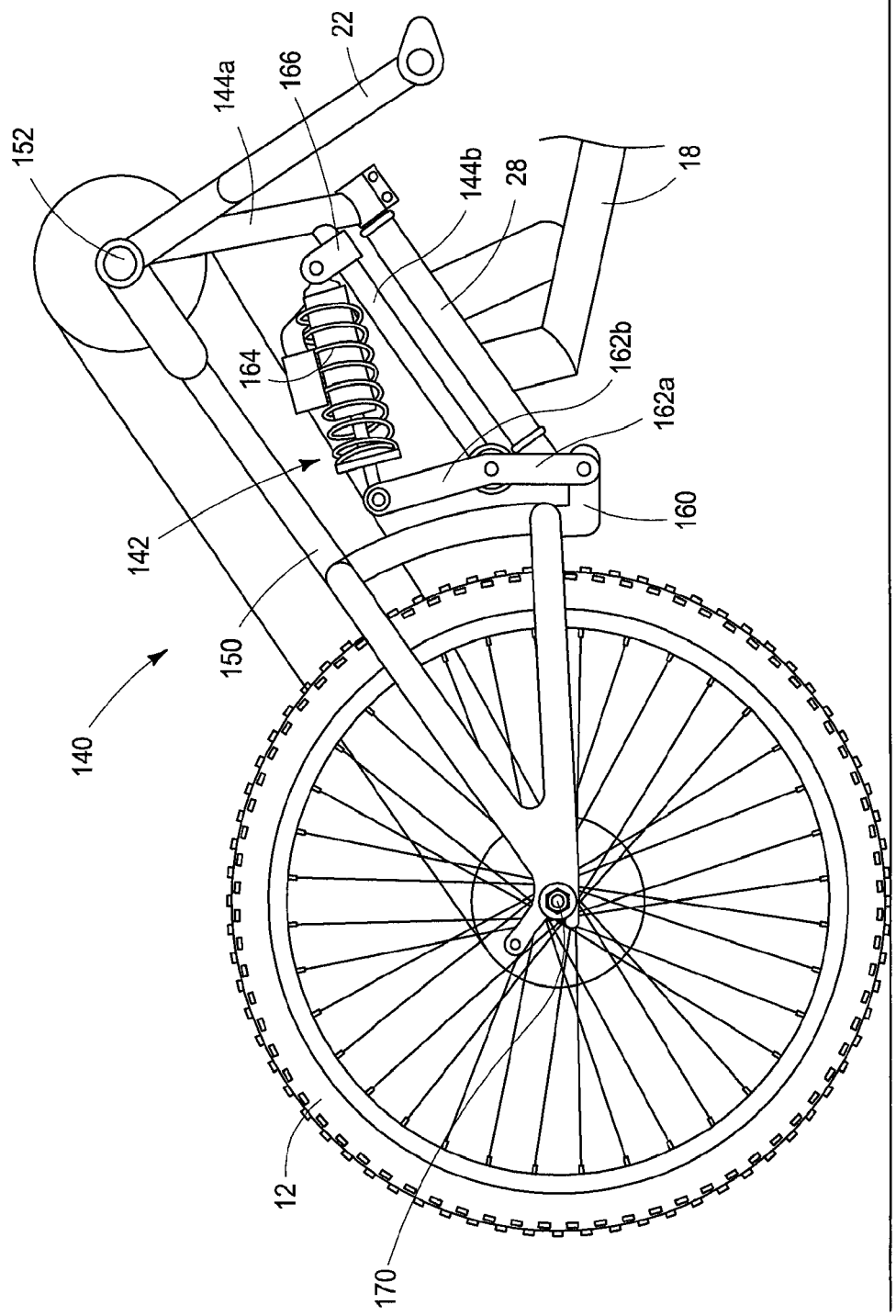
FIG. 6 illustrates an alternative embodiment of the handcycle suspension system.

FIG. 6 illustrates an alternative embodiment of the front fork and front suspension of handcycle. Front fork 140 is similar to front fork 14. Front fork 140 includes front suspension 142. Front fork 140 includes two main structures or portions, a fixed portion and a pivoting portion. A fixed portion of front suspension 142 includes mounting bracket 144 of front fork 140. Mounting bracket 144 includes vertical portion 144a and horizontal portion 144b. Mounting bracket 144 is mounted to frame 18 at axle 28. Mounting bracket 144 of front fork 140 is mounted such that mounting bracket 144 does not pivot vertically with respect to frame 18. Mounting bracket 144 is able to rotate as a part of the entire front fork 140, which rotates about axle 28 with respect to frame 18 to allow handcycle steering. Therefore, the fixed portion of front fork 140 is fixed in terms of a vertical direction, but moves freely about axle 28.

The articulating or pivoting portion of front suspension 142 includes pivoting fork 150 of front fork 140. Front fork 140 is configured to allow pivoting fork 150 to pivot with respect to mounting bracket 144. Pivoting fork 150 is pivotally coupled to mounting bracket 144 at upper or main pivot point 152. Front wheel 12 is mounted between prongs of pivoting fork 110. When front wheel 12 traverses a bump, front wheel 12 raises up in a vertical or z-direction causing pivoting fork 150 to move in a vertical direction. Mounting bracket 144 and frame 18 remain fixed in the vertical direction while pivoting fork 150 pivots at main pivot point 152. As a part of the overall structure of front fork 140 which rotates or tilts to steer handcycle 10, pivoting fork 150 also rotates about axle 28. Therefore, pivoting fork 150 is configured to articulate in two directions relative to frame 18. Pivoting fork 150 pivots vertically as a part of front suspension 142 and also rotates with front fork 140 about axle 28 to allow steering of handcycle 10. Pivoting fork 150 pivots at main pivot point 15. Main pivot point 152 is located on the bracket shell of mounting bracket 144. The bracket shell is part of or coupled to mounting bracket 144 and corresponds to the location of main pivot point 152. Therefore, main pivot point 152 is not required to be offset from the bracket shell on mounting bracket 144. Instead, main pivot point 152 can be in line with mounting bracket 144 or located on mounting bracket 144.

Front suspension 142 is similar to front suspension 40. Front suspension 142 includes lower link 160, rocker arm 162, and shock absorber 164. Lower link 160 is similar to lower link 52. Rocker arm 162 is similar to rocker arm 56. Shock absorber 164 is similar to shock absorber 50. Shock absorber 164 is pivotally coupled to shock mount 166. Shock mount 166 is rigidly affixed to vertical portion 144a or horizontal portion 144b of mounting bracket 144, or shock mount 166 is rigidly affixed to both vertical and horizontal portions 144a and 144b of mounting bracket 144. Shock mount 166 and mounting bracket 144 together constitute the vertically fixed or stationary portion of front fork 140.

Pivoting fork 150 constitutes a pivoting portion of front fork 140. Front suspension 142 is disposed between pivoting fork 150 and mounting bracket 144. Lower link 160 and rocker arm 162 constitute a lever assembly disposed between pivoting fork 150 and mounting bracket 144. The lever assembly of front suspension 142 transfers vertical motion of pivoting fork 150 into a force directed into shock absorber 164. The direction of force is substantially parallel to the shock absorber and can be described as a horizontal force. Shock absorber 164 of front suspension 142 is configured to absorb the horizontal force transferred from the lever assembly.

Front suspension 142 reduces the impact to handcycle 10 when front wheel 12 encounters uneven terrain. Generally, vibration at the front of handcycle 10 is felt by the rider most dramatically in handlebars 22. As front wheel 12 moves up and down over the terrain, pivoting fork 150 pivots with the vertical motion of front wheel 12 while front suspension 142 absorbs and dampens the motion of pivoting fork 150. Pivoting fork 150 allows mounting bracket 144, including a bracket shell, and frame 18 to remain in a neutral position with respect to the ground when handcycle 10 hits a bump. Handcycle 10 does not lift upwards at the front end. Instead, end 170 of pivoting fork 150 raises and lowers, while the rest of handcycle 10 remains substantially parallel to or neutral with the ground. The steadiness of handcycle 10 reduces vibration in handcycle 10. Front suspension 142 substantially reduces vibration in handlebars 22 compared to a handcycle without front suspension 142. Because movement and vibration in handcycle 10 are reduced by front suspension 142, rider retains a better hold on handlebars 22 and maintains better control over handcycle 10. Reduced vibration in handcycle 10 makes handcycle 10 easier and more comfortable to ride. The rider retains better control over steering handcycle 10. Front wheel 12 maintains better contact with the ground and other surfaces. Therefore, front suspension 142 improves the stability, traction, and control of handcycle 10. Handcycle 10 is also safer to ride because a rider's control over handcycle 10 is improved.

While one or more embodiments of the present invention have been illustrated in detail, the skilled artisan will appreciate that modifications and adaptations to those embodiments may be made without departing from the scope of the present invention as set forth in the following claims.

What is claimed is:

1. A suspension device for a handcycle, comprising:
   a handcycle axle including an outer shaft;
   a first handcycle frame member including a crankarm and an inner shaft, the inner shaft rotationally coupled to the outer shaft;
   a second handcycle frame member pivotally coupled to the first handcycle frame member;
   a shock absorber directly coupled to the first handcycle frame member; and
   a lever arm including a first end directly coupled to the second handcycle frame member and a second end directly coupled to the shock absorber, the lever arm pivotally coupled to the first handcycle frame member at a first pivot point between the first and second ends of the lever arm to transfer a vertical motion of the second handcycle frame member into non-vertical motion directed into the shock absorber.

2. The suspension device of claim 1, further including:
a handlebar disposed on the first handcycle frame member at a mounting point; and
a second pivot point disposed on the first handcycle frame member offset from the mounting point, wherein the second handcycle frame member is configured to pivot at the second pivot point.

3. The suspension device of claim 1, wherein the lever arm further comprises a first arm and a second arm coupled at an angle which allows motion of the second handcycle frame member to be directed into the shock absorber.

4. The suspension device of claim 1, wherein:
the shock absorber is pivotally coupled to the first handcycle frame member; and
the lever arm is pivotally coupled at the first end to the second handcycle frame member and is pivotally coupled at the second end to the shock absorber.

5. The suspension device of claim 1, further including:
a crankarm coupled to the first handcycle frame member; and
a footrest coupled to the second handcycle frame member.

6. A suspension device for a handcycle, comprising:
a handcycle axle;
a handcycle frame including a first frame member pivotally coupled to a second frame member at a first pivot point, the second frame member including a crankarm and rotationally coupled to the handcycle axle;
a shock absorber coupled between the first frame member and the second frame member; and
a lever including a first end coupled to the first frame member and a second end coupled to the shock absorber, the lever pivotally coupled to the second frame member at a second pivot point between the first end and the second end of the lever and configured to transfer a vertical motion of the first frame member into non-vertical motion.

7. The suspension device of claim 6, further including:
a handlebar disposed on the second frame member at a mounting point; and
the first pivot point disposed on the second frame member offset from the mounting point.

8. The suspension device of claim 6, wherein the non-vertical motion is directed by the lever into the shock absorber.

9. The suspension device of claim 6, wherein the lever further comprises a first arm and a second arm coupled at an angle which allows motion of the first frame member to be directed into the shock absorber.

10. The suspension device of claim 6, wherein the shock absorber is pivotally coupled to the second frame member at a third pivot point.

11. The suspension device of claim 6, wherein the handcycle axle includes an outer shaft and the second frame member includes an inner shaft rotationally coupled to the outer shaft.

12. A handcycle, comprising:
a handcycle axle;
a mounting bracket rotationally coupled to the handcycle axle;
a front fork pivotally coupled to the mounting bracket at a first pivot point; and
a suspension assembly disposed between the front fork and the mounting bracket, the suspension assembly including,
(a) a lever pivotally coupled to the mounting bracket at a second pivot point and pivotally coupled to the front fork, and
(b) a shock absorber directly coupled to the mounting bracket and to the lever, the lever configured to transfer a vertical motion of the front fork into non-vertical motion directed into the shock absorber.

13. The handcycle of claim 12, wherein the lever further comprises a first arm and a second arm coupled at an angle which allows motion of the front fork to be directed into the shock absorber.

14. The handcycle of claim 12, further including:
a handlebar coupled to the mounting bracket at a mounting point; and
wherein the first pivot point is offset from the mounting point.

15. The handcycle of claim 12, wherein the second pivot point is disposed between a first end and a second end of the lever.

16. The handcycle of claim 12, wherein the lever is coupled to the front fork at a first end of the lever and is coupled to the shock absorber at a second end of the lever.

17. A method of making a suspension device for a handcycle, comprising:
providing a handcycle frame including a first frame member pivotally coupled to a second frame member, the second frame member including a crankarm;
disposing a shock absorber between the first frame member and the second frame member;
coupling a lever assembly to the first- and second frame members and to the shock absorber to transfer motion of the first frame member into the shock absorber; and
transferring a vertical motion of the first frame member into non-vertical motion directed into the shock absorber.

18. The method of claim 17, further including providing a third frame member, the first and second frame members rotationally coupled to the third frame member.

19. The method of claim 17, wherein coupling the lever assembly further includes pivotally coupling a first lever to the second frame member at a pivot point, the pivot point disposed between a first end and a second end of the first lever.

20. The method of claim 19, wherein pivotally coupling the first lever further includes coupling a first arm and a second arm at an angle which allows motion of the second frame member to be directed into the shock absorber.

* * * * *